United States Patent [19]

Butler

[11] Patent Number: 4,991,637
[45] Date of Patent: Feb. 12, 1991

[54] TRIMMER APPARATUS AND METHOD

[76] Inventor: Timothy J. Butler, P.O. Box 6454, High Point, N.C. 27262

[21] Appl. No.: 389,183

[22] Filed: Aug. 3, 1989

[51] Int. Cl.$^5$ .............................................. B27M 1/00
[52] U.S. Cl. .................................. 144/372; 144/142; 144/144 R; 144/144 A; 144/371; 409/84; 409/97
[58] Field of Search ........... 144/144 R, 144 A, 144 B, 144/144 C, 144 D, 136 R, 142, 117 B, 371, 372; 409/84, 90, 97, 110

[56] References Cited

U.S. PATENT DOCUMENTS

| | | | |
|---|---|---|---|
| 2,600,055 | 6/1952 | Hansen | 144/141 |
| 4,142,444 | 3/1979 | Doraper | 144/134 R |
| 4,260,001 | 4/1981 | De Muynck | 144/3 R |
| 4,593,735 | 6/1986 | Wirth, Jr. | 144/137 |
| 4,733,997 | 3/1988 | Fond et al. | 144/144 A |

Primary Examiner—W. Donald Bray

[57] ABSTRACT

A trimmer apparatus and method for utilizing the same is presented which includes a cutting assembly formed from a quadrangular frame which is pivotally joined to a stand and a laminated object is moved therealong on a support in a lineal path whereby the edge of the laminate is trimmed to the contour of the substrate. The quandrangular cutting assembly frame allows the cutting blade to move in an arcuate path for trimming rounded ends of table tops or the like.

25 Claims, 5 Drawing Sheets

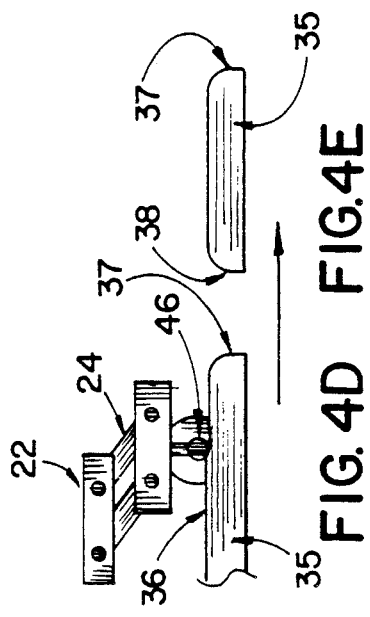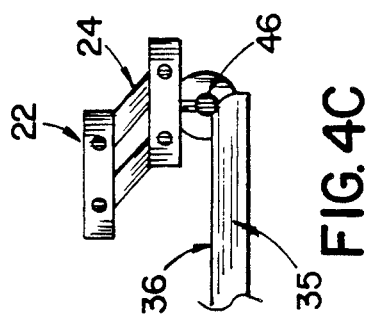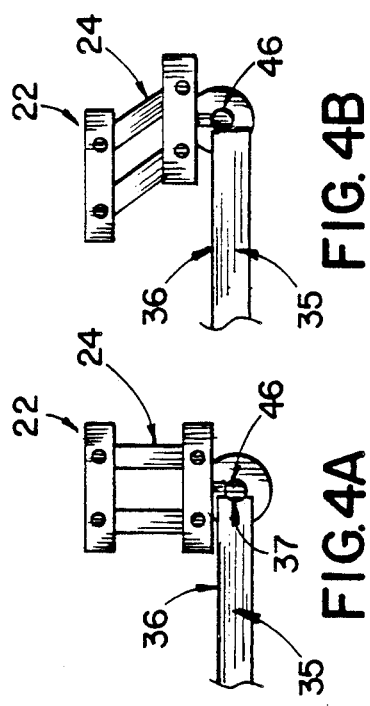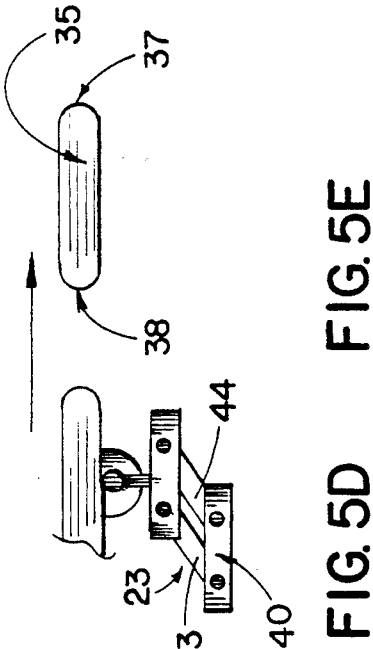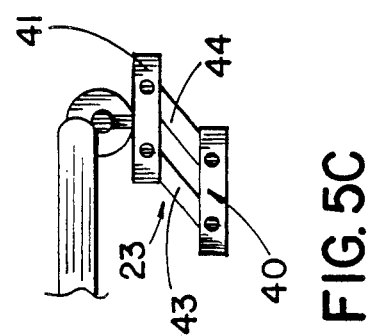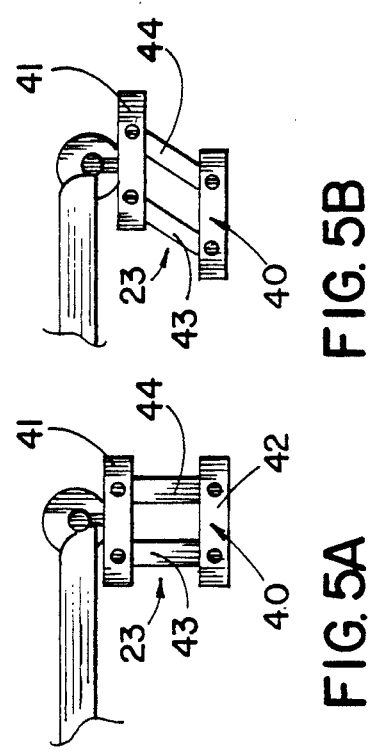

TRIMMER APPARATUS AND METHOD

BACKGROUND OF THE INVENTION

1. Field of the Invention

The present invention pertains to woodworking equipment and specifically equipment and methods for trimming thin lamina which are attached to various contoured substrates.

2. Description of the Prior Art and Objectives of the Invention

In woodworking, furniture and other industries it is becoming increasingly popular to produce products which have laminated surfaces. Such laminates are generally formed from various polymeric or other synthetic lamina and may include natural or bonded wood substrates. The laminae are generally thin, usually less than 1/16 of an inch in thickness and are attached by hot melt adhesives or by other methods to a relatively inexpensive substrate such as pressed chipboard, plywood or otherwise. Once the binder such as an adhesive is in place and set, the edges of the board or the like are conventionally trimmed manually or by mechanical means to a finished surface, oftentimes with the subsequent addition of edge or bottom lamina likewise being attached and trimmed. In recent years it has become standard in the industry to automatically trim planar laminates with various types of equipment presently on the market. Such conventional equipment will do an excellent job of trimming a flat edge, but with the increasing popularity of "roll" or "rounded" corners, the currently available trimming equipment cannot finish the rounded or curved edge surfaces and such work is left for manual trimming which is expensive and oftentimes, if not precisely done, can result in a discard or "second".

Thus, with the known disadvantages and problems associated with laminate trimming of curved or rounded edges, the present invention was conceived and one of its objectives is to provide a device which will trim a laminated product having a curved edge.

It is still another objective of the present invention to provide a device having a quadrangular cutting assembly which will automatically trim a curved laminate with accuracy and ease.

It is still another objective of the present invention to provide a trimmer apparatus and method which can be quickly used and easily learned by relatively inexperienced workers.

Various other objectives and advantages of the present invention become apparent to those skilled in the art as a more detailed description is presented below.

SUMMARY OF THE INVENTION

The aforementioned and other objectives are realized by providing trimmer apparatus which includes a base or stand having a means to trim the laminate pivotally affixed thereto. The trimmer includes a quadrangularly shaped frame with a cutting blade, and the frame is pivotally attached to the stand. An electric motor drives the cutting blade and is mounted on the frame. A laminate support is affixed to the frame whereby an object such as a laminated table top with front and rear rounded ends can be positioned on the support and can move in a lineal path along the support where it comes into contact with the cutting blade for trimming one side of the top edge. As the laminate has rounded ends, the method of trimming will allow the cutting blade to move in an arcuate path at the front and rear of the laminate as it passes through the blade whereby the upper portion of the front and rear end edges of the laminate will be trimmed to contour. In one method, using a single cutting assembly, by turning the laminate over and passing it again through the cutting blade, the top and bottom portions or rough edges of the laminate with rounded ends will be trimmed to the proper shape. In another method, one cutting assembly is mounted above the laminate and a second cutting assembly is mounted below the laminate for "one pass per side" contour trimming.

BRIEF DESCRIPTION OF THE DRAWINGS

FIGS. 4A-E demonstrates the steps of trimming a laminated object having rounded ends;

FIGS. 5A-5E illustrate the method of trimming the bottom edge of one side of the object as seen in FIG. 4.

DESCRIPTION OF THE PREFERRED EMBODIMENT

Figure 1:
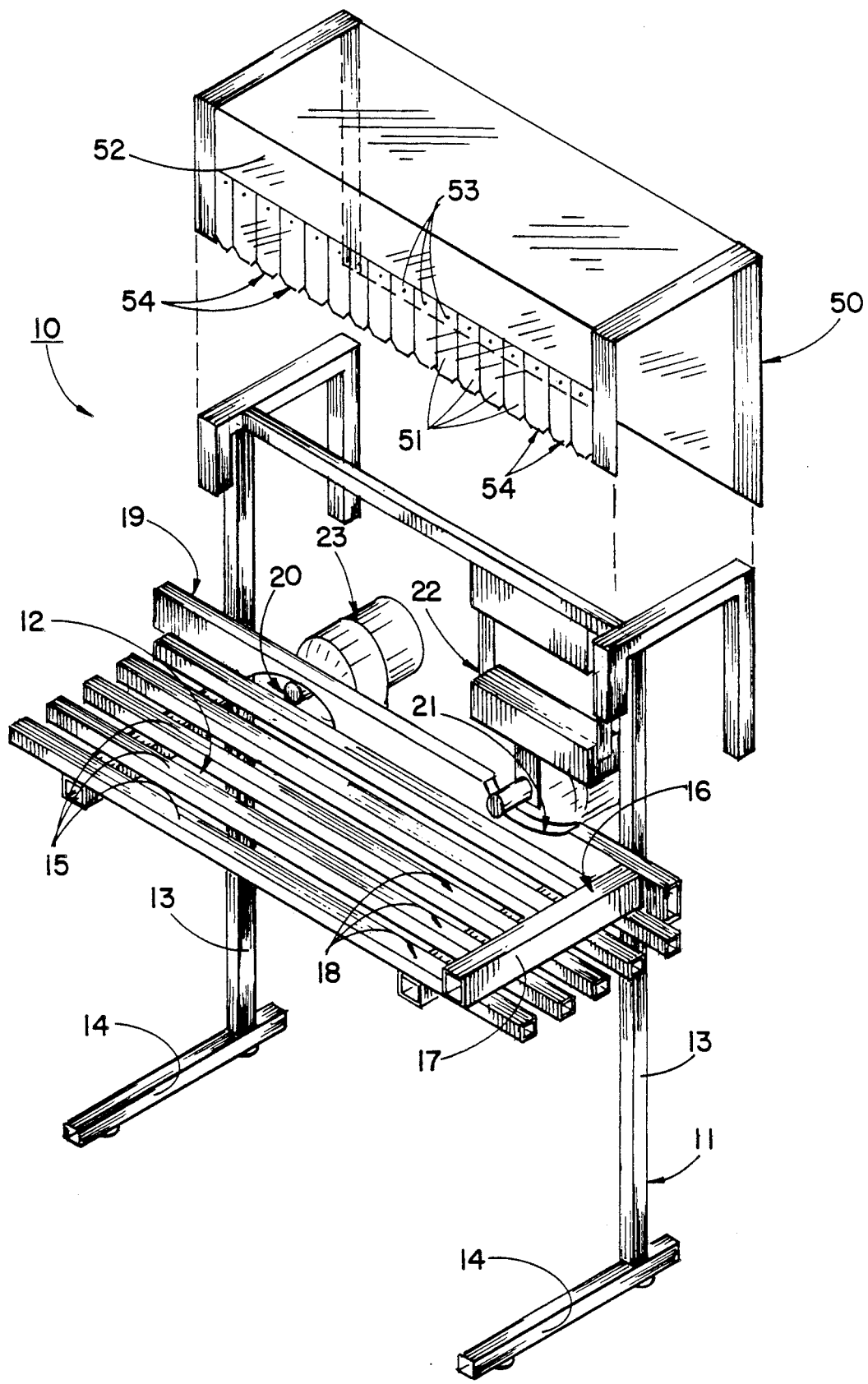
FIG. 1 illustrates in perspective fashion a trimmer apparatus of the invention having a pair of cutting assemblies.

The preferred form of the apparatus is shown in FIG. 1 and includes trimmer apparatus having a stand with both an above and below positioned cutting assembly used to simultaneously, in a single pass, trim the top and bottom of one side edge of laminates with rounded ends. The trimmer apparatus includes a stand, a laminate support affixed to the stand, a pair of cutting assemblies each with quadrangular pivotable frames and a transparent safety shield having "swinging" guards.

The preferred method of the invention includes directing a laminated object along the lineal path of the laminate support to the cutting assembly, intersecting the object with the cutting assembly and moving the blades of the cutting assemblies in arcuate paths as the quadrangular frame pivots at the ends of the object to thereby trim the laminate to the desired contour.

DETAILED DESCRIPTION OF THE DRAWINGS AND OPERATION OF THE INVENTION

For a more detailed description of the invention and its method of operation, turning now to the drawings, FIG. 1 illustrates trimmer apparatus 10 which may be formed of one (1) inch square tubular steel. Mounted on stand 11 at approximately waist height is laminate support 12 which is adjustably affixed to stand 11 whereby the height of support 12 can be moved vertically along legs 13 of stand 11 to accommodate various laminate thicknesses. Attached to legs 13 are feet 14 which are also formed from tubular steel and may be attached to the floor or otherwise as required to secure stand 11 in a stable position. Support 12 is formed from a series of parallel tubular steel members 15 and slidably joined thereto on the right side as shown in FIG. 1, is support saddle 16. Support saddle 16 comprises a rear edge guide 17 and saddle tines 18 which are attached to edge guide 17 and which fit between support members 15. Thus, by placing a laminated object on support members 15, tines 18 are therefore underneath and help hold the laminate as it is manually pushed from right to left (FIG. 1) in a lineal path along support 12. Side edge guide 19 is joined in parallel fashion to support 12 and provides a smooth surface for guiding the edge to be trimmed of a laminate as placed on support 12. Edge guide 19 has a pair of curved notches 20 and 21 to allow for the movement of first and second cutting assemblies 22 and 23 as shown in FIG. 1.

Figure 2:
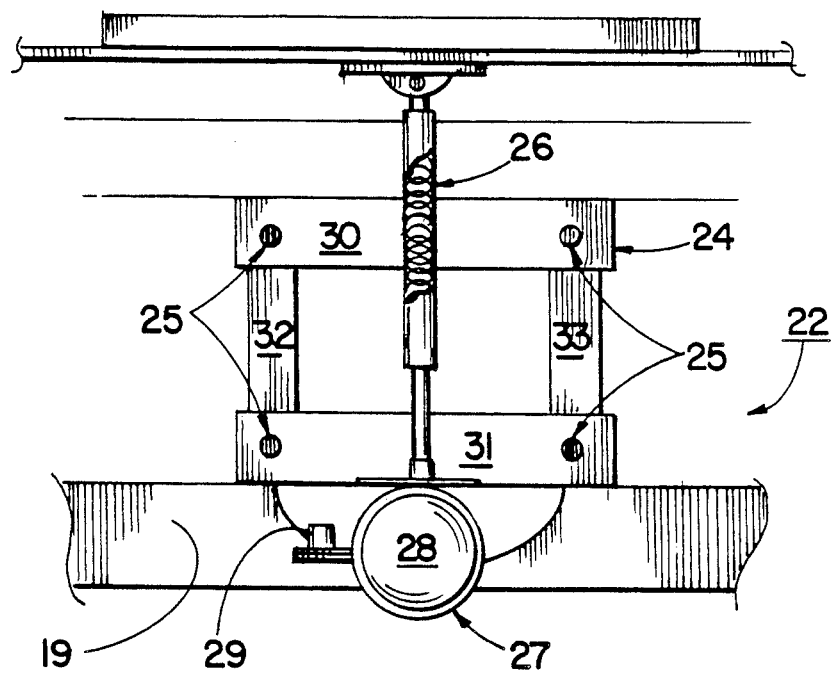
FIG. 2 shows a rear view of the cutting assembly as seen in FIG. 1.
Figure 3:
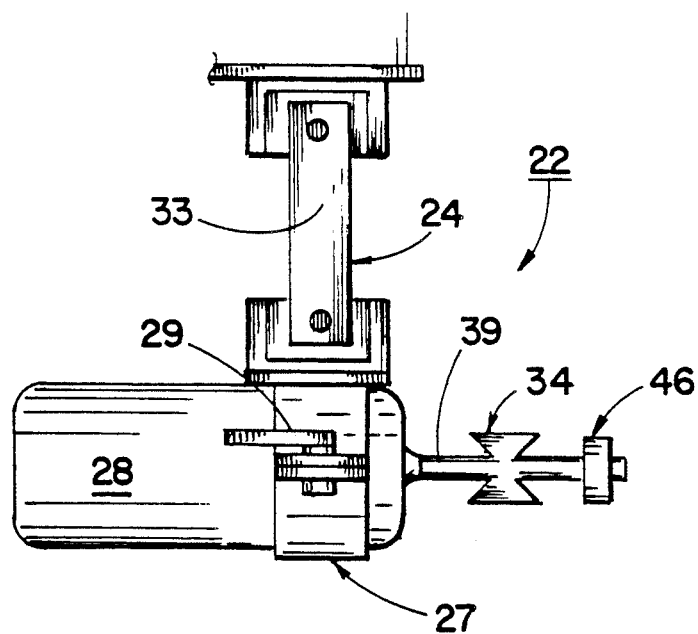
FIG. 3 illustrates a side elevational view of a portion of the cutting assembly as seen in FIG. 2.
Figure 3A:
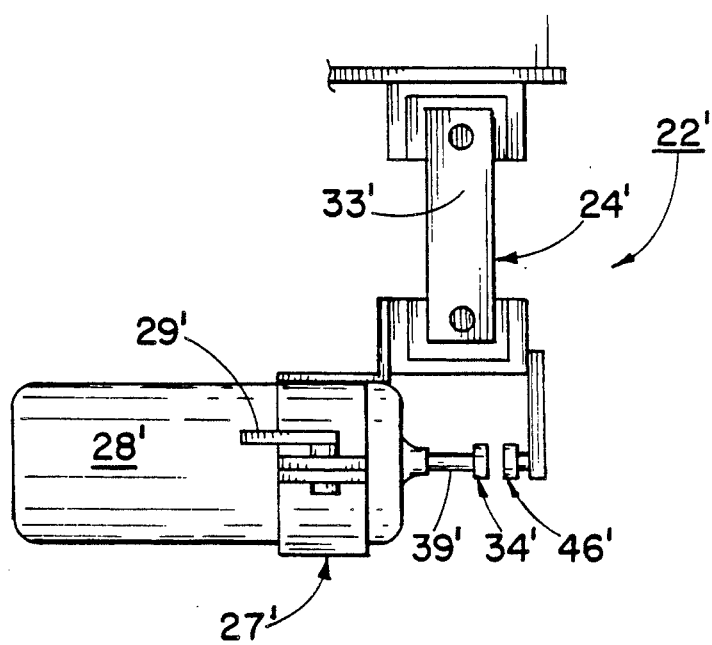
FIG. 3A illustrates another embodiment of a side elevational view of a portion of a cutting assembly similar to the cutting assembly as shown in FIG. 3.

First cutting assembly 22, as shown in FIGS. 2 and 3, has a quadrangular frame 24 which is pivotally joined at each corner by pins 25 for pivoting purposes as will be explained later herein. Quadrangular frame 24 includes top member 30, bottom member 31, left member 32 and right member 33 as shown in FIG. 2. First cutting assembly 22 also includes resilient member 26 consisting of a spring, gas or air loaded cylinder which acts to return cutting assembly 22 to its "home" or rest position. Motor clamp 27 is joined to resilient member 26 and includes handle 29 which is rotated to loosen or tighten motor clamp 27 as is conventional in the art. Motor 28 which may be for example a one-quarter horsepower 110 V AC electric motor rotates cutter blade 34 joined to motor shaft 39. Roller bearing 46' is not affixed to blade 34 ' and the diameter of roller bearing 46' is substantially the same as the diameter of blade 34', as seen in FIG. 3A.

FIG. 3 shows another cutting assembly. FIG. 3 includes bearing 46 which is affixed to blade shaft 39 whereas in FIG. 3A, roller bearing 46' is spaced from blade 34' which is on shaft 39' since roller bearing 46' affixed to quadrangular frame 24'. The function of roller bearing 46 and 46' as shown in FIGS. 3 and 3A respectively is to contact the laminated object to secure it to the support surface during trimming.

Cutting assembly 22 is substantially the same as cutting assembly 23 as shown in FIG. 1, only cutting assembly 23 is inverted. Thus, cutting assembly 22 trims the top edge and ends of a laminate and thereafter, as the laminate travels along the lineal path of support 12, cutting assembly 23 trims the "bottom" edge and end.

To better understand the method of operation of the invention, in FIG. 4 laminated object 35 as seen in FIGS. 4A-E proceeds with cutting blade 34 (not seen in FIG. 4) contacting the top inside edge 36 and the front end 37 of laminated object 35. As also shown in FIG. 4A, the inside edge of end 37 is brought into contact with cutting blade 34 (not shown, but immediately behind roller bearing 31. In FIG. 4B, quadrangular frame 24 pivots from its "rest" or square position as shown FIG. 4A to a slightly pivoted position in FIG. 4B as front end 37 is trimmed. As further shown in FIG. 4C, as laminated object 35 moves from left to right along its lineal path, quadrangular frame member 24 pivots further and acts as a parallelogram as blade 34 moves in an arcuate path to round the top inside edge 36 of laminated object 35 as shown in FIGS. 4B and 4C. Cutting assembly 22 also trims the top inside edge 36 of laminated object 35 as further shown in FIG. 4D. Once cutting blade 34 reaches the rear inside edge 38 of laminated object 35, it follows the rear contour of the substrate and rounds the top of end 38 as shown in FIG. 4E. Next, after passing laminated object or laminate 35 through cutting assembly 22 as shown in FIGS. 4A-E, only one side edge of the object has been trimmed, and as shown in FIGS. 5A-5E, the opposite side edge of laminate 35 is trimmed by cutting assembly 23. Second cutting assembly 23 includes quadrangular frame 40 having top member 41, bottom member 42 left member 43, and right member 44. Trimmer apparatus 10 as seen in FIG. 1 includes a pair of cutting assemblies including first and second cutting assemblies 22 and 23 but could also include additional cutting assemblies for trimming the opposite side edge of an object at the same or different time and could also be automated to feed laminated object 35 therethrough thereby eliminating manual feeding as utilized with support saddle 16 of laminate support 12 (FIG. 1).

Safety shield 50 as seen in FIG. 1 is formed from a transparent acrylic and includes a series of "gates" 51 which are swingably joined to the front portion 52 of shield 50. Gates 51 are suspended or rotate around pivot pins 53 whereby bottom ends 54 can deflect and drag on the object while it is being trimmed and will stop chips from flying into the eyes of the operator.

As understood in FIGS. 4 and 5, resilient member 26 is utilized to return first cutting assembly 22 to its relaxed or rest posture as shown in FIG. 4A. Likewise, a second resilient member (not shown) is used to return second cutting assembly 23 to its rest posture as shown in FIG. 5A.

Figure 6:
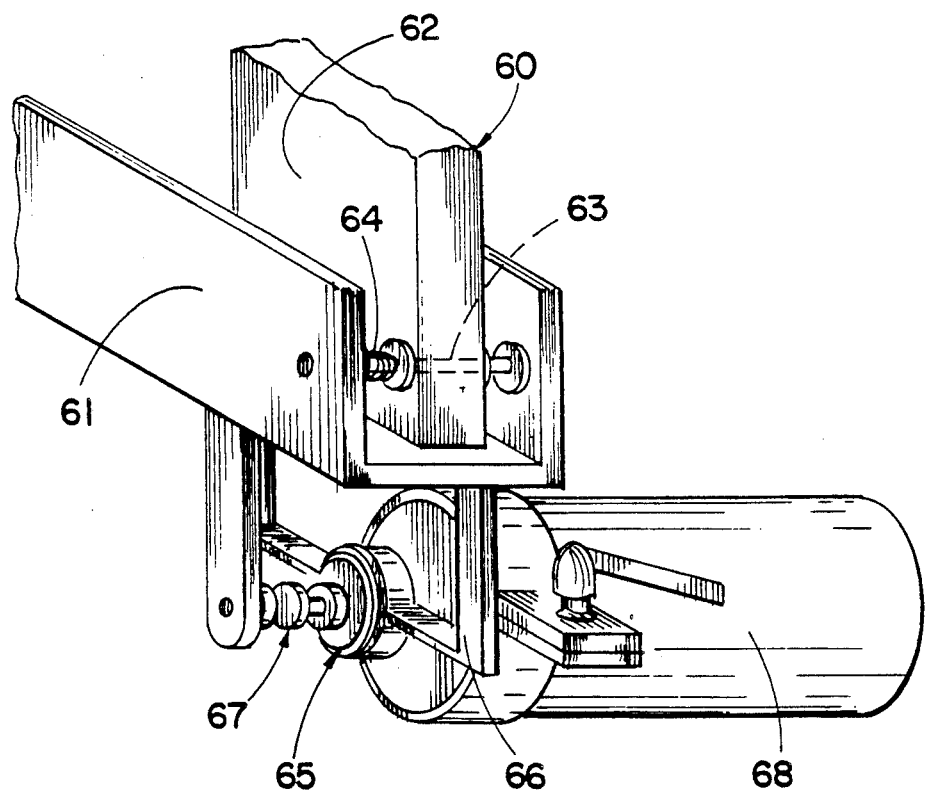
FIG. 6 demonstrates a partial view of another embodiment of a cutting assembly having a beveled ring guide fence.

In FIG. 6 another embodiment of quadrangular frame assembly 60 is shown in cut-away fashion whereby bottom quadrangular frame member 61 is attached to side quadrangular frame member 62 by axle 63. As would be understood, coil spring 64 resiliently affixes member 61 to member 62, and as beveled ring 65 is attached to bottom member 61 by bracket 66, which is rigidly affixed to cutter motor 68. As a panel or object passing through blade 67 is evenly cut, even if the panel were stressed or bowed due to the movement of frame member 61.

Figure 7:
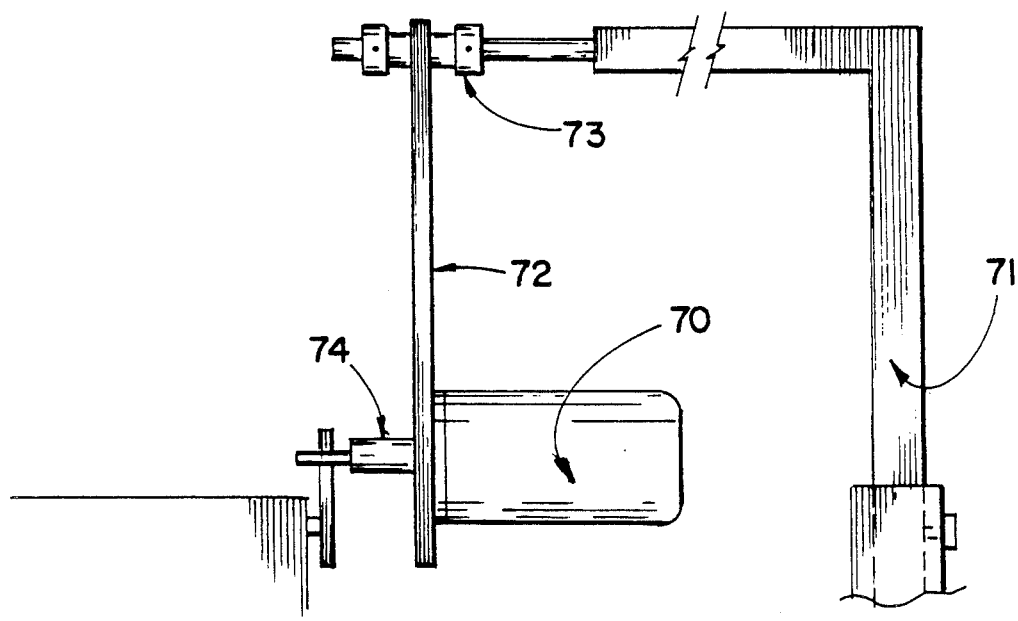
FIG. 7 demonstrates a cutting assembly which is suspended by a "pendulum" motor and blade support.

As seen in FIG. 7, cutter motor 70 attached to stand 71 via pendulum member 72 which is rotatably affixed to suspension member 73. By use of pendulum member 72 a single element provides blade 74 with an arcuate trimming motion.

A continuous feeding system utilizing belts or otherwise for receiving laminates from conventional edge banding machines could be employed for more automated processing. Also the trimmer apparatus could be affixed to feed into an automatic stacking machinery for high production requirements, eliminating additional manual handling of the finished, trimmed laminates. Thus, the trimmer apparatus as shown in FIG. 1 could be independent or joined to other equipment in a continuous operation.

The illustrations and examples provided herein are for explanatory purposes and are not intended to limit the scope of the appended claims.

I claim:

1. Trimmer apparatus comprising: a stand, means to trim an object, said trim means being vertically, pivotally affixed to said stand, said trim means comprising a pendulum member, a motor, and a blade attached to said motor, said motor attached to said pendulum member, said trim means being arcuately movable laterally along said stand.

2. Trimmer apparatus as claimed in claim 1 and including a resilient member, said resilient member attached to said trim means.

3. Trimmer apparatus comprising: a stand, means to trim an object, said trim means comprising: a frame, said frame vertically, pivotally attached to said stand, a motor, a blade attached to said motor, a roller guide, said roller guide attached to said blade, said roller guide for contacting said object as said blade trims the same.

4. Trimmer apparatus as claimed in claim 3 wherein said frame is quadrangularly shaped.

5. Trimmer apparatus as claimed in claim 3 wherein said frame comprises a parallelogram.

6. Trimmer apparatus as claimed in claim 1 wherein said motor comprises an electric motor.

7. Trimmer apparatus as claimed in claim 3 comprising a plurality of trim means pivotally attached to said stand.

8. Trimmer apparatus as claimed in claim 7 and including a plurality of resilient members, each of said frames having one of said resilient members attached thereto.

9. Trimmer apparatus as claimed in claim 1 and including a safety shield, said shield attached to said stand.

10. Trimmer apparatus as claimed in claim 9 and including a plurality of gates, said gates pivotally attached to said shield.

11. Trimmer apparatus as claimed in claim 1 and including an object support, said support positioned proximate said trim means, said object support affixed to said stand.

12. Trimmer apparatus as claimed in claim 11 and including a support saddle, said saddle slidably positioned on said laminate support.

13. Trimmer apparatus as claimed in claim 1 wherein said trim means includes a motor clamp.

14. Trimmer apparatus as claimed in claim 13 wherein said motor clamp includes a means to tighten said clamp to a motor, said tightening means having a rotatable handle.

15. Trimmer apparatus as claimed in claim 3 wherein said blade is a rotatable blade.

16. Trimmer apparatus as claimed in claim 15 wherein said blade and roller guide have substantially the same diameter.

17. Trimming apparatus as claimed in claim 1 and including a cutting blade, said cutting blade attached to the distal end of said pendulum member.

18. Trimming apparatus as claimed in claim 4 and including a beveled guide ring, said guide ring attached to said frame.

19. Trimming apparatus as claimed in claim 3 wherein said frame is spring loaded.

20. Trimming apparatus as claimed in claim 18 wherein said beveled guide ring is attached to said quadrangular frame.

21. Trimmer apparatus comprising: a stand, means to trim an object vertically, pivotally connected to said stand, said trim means having:
 (a) a pivotal quadrangle frame,
 (b) an electric motor, and
 (c) a cutting blade, said blade joined to said motor, said motor attached to said frame, and
 (d) a roller guide, said roller guide for contacting said object during trimming, said roller guide attached to said blade,
and object support, said support attached to said stand proximate said trim means, a resilient member, said resilient member affixed to said trim means whereby an object can be placed on said support and trimmed by said cutting blade as said object moves along said support while said quadrangle frame pivots from a rest position as said resilient member urges said quadrangle frame to return to its rest position.

22. The method of trimming an object comprising the steps of:
 (a) directing the object to be trimmed along a lineal path to a means for trimming the object,
 (b) intersecting the object with the trim means, and
 (c) moving the trim means in a vertical, arcuate path to trim the object and,
 (d) continuously moving the object along the lineal path while continuously trimming the object as said trim means moves in said vertical, arcuate path.

23. The method of claim 22 and including the step of intersecting the object with a second trim means.

24. The method of claim 22 and including the step of trimming the object with the second trim means while continuously moving the object along its lineal path.

25. The method of claim 22 and including the step of urging the second trim means against the object as the object travels along its lineal path while said second trim means moves in an arcuate path.

* * * * *